United States Patent Office 3,334,069

Patented Aug. 1, 1967

3,334,069
PROCESS FOR THE CHLOROALKYLATION OF POLYPHENYLENE OXIDES

Willem F. H. Borman, Dalton, Mass., assignor to General Electric Company, a corporation of New York No Drawing. Filed Mar. 29, 1965, Ser. No. 443,664
5 Claims. (Cl. 260—47)

ABSTRACT OF THE DISCLOSURE

A procedure for the preparation of α-chloroalkyl substituted polyphenylene oxides involving the chlorination of a polyphenylene oxide having at least one alkyl substituent by contacting the polymer with chlorine gas in the presence of either phosphorous trichloride or phosphorous pentachloride.

This invention relates to an improved process for the preparation of α-chloroalkyl substituted polyphenylene oxides. More particularly, this invention relates to an improved process for the preparation of α-chloroalkyl substituted polyphenylene oxides employing chlorine gas as a chlorinating agent in the presence of $PCl_3$ or $PCl_5$.

In copending patent application Ser. No. 212,128 of Allan S. Hay, filed July 24, 1962, now Patent No. 3,306,-875 assigned to the same assignee as the present invention, the contents of which are incorporated herein by reference, there is disclosed and claimed a new family of plastics identified as the polyphenylene oxides as well as a process for their preparation. The polyphenylene oxides have the repeating structural unit represented by the following formula:

(I)

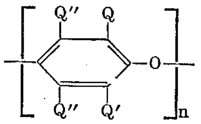

wherein the oxygen atom of one unit is connected to the phenylene nucleus of the adjoining unit, *n* is a positive integer of at least 100, Q is a monovalent substituent selected from the group consisting of hydrogen, aliphatic hydrocarbon radicals free of a tertiary α-carbon atom, and aliphatic halohydrocarbon radicals having at least two carbon atoms and being free of a tertiary α-carbon atom, Q′ and Q″ are both monovalent substituents which are the same as Q and in addition, halogen, arylhydrocarbon radicals, haloarylhydrocarbon radicals, hydrocarbonoxy radicals having at least two carbon atoms and being free of an aliphatic, tertiary α-carbon atom, and halohydrocarbonoxy radicals having at least two carbon atoms and being free of an aliphatic, tertiary α-carbon atom. The method comprises reacting oxygen in the presence of a tertiary amine and a cuprous salt soluble in the tertiary amine and capable of existence in the cupric state with a phenol having the structural formula:

(II)

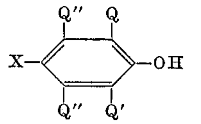

wherein X is hydrogen, chlorine, bromine or iodine and Q′ and Q″ are as defined above. Other specific mixed polyphenylene oxides of the same general type which are useful in the practice of this invention are disclosed and claimed in a copending application of Jack Kwiateck, Ser. No. 744,087, filed June 24, 1958, now Patent No. 3,134,753 and assigned to the same assignee as the present invention. Because α-haloalkyl groups are hydrolytically reactive, they produce undesirable products in the above oxidation reaction if they are substituents on the phenol and are excluded from the claims of the above-identified copending applications.

In copending U.S. patent application Ser. No. 155,827 of Allan S. Hay, filed Nov. 29, 1961, now Patent No. 3,262,911 assigned to the same assignee as the present invention, the contents of which are incorporated herein by reference, the method of preparing polyphenylene oxides having halomethyl groups in the 2- or 2,6-positions is described and claimed. This method comprises reacting a brominating or chlorinating agent with a corresponding methyl substituted polyphenylene oxide in an attempt to substitute the bromine or chlorine in the methyl group to produce the corresponding mono, di or tribromomethyl or mono, di or trichloromethyl groups. The desired composition obtained from this halogenating process may be represented by the repeating structural unit as follows:

(III)

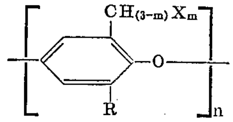

wherein the oxygen atom of one repeating unit is connected to the phenylene nucleus of the adjoining unit, *n* is a positive integer and is at least 100, *m* is a number from 0.01 to 3 inclusive, X is a halogen selected from the group consisting of chlorine and bromine, and R is a monovalent substituent selected from the group consisting of hydrogen, halogen, hydrocarbon, halohydrocarbon, hydrocarbonoxy, and halohydrocarbonoxy. Preferably, *m* is 0.1 to 2 and R is hydrogen, methyl, or halomethyl, for example, $-CH_{(3-m)}X_m$, where X and *m* are the same as defined above.

When the Hay process is used to form chloromethyl groups, it has been found that the process leads to a chlorinated polymer wherein as many as four out of ten chlorides are substituted on the aromatic nucleus. The aromatic chlorine is much less reactive than the benzylic chlorine which can be exchanged with a number of functional groups including tertiary amines, trialkyl phosphites, etc. to yield ion exchange resins and antistatic coating materials; and with phenols to yield crosslinkable, thermosetting polymer modifications. In addition to this lack of reactivity, the introduction of an aromatic chlorine in the molecule is accompanied by extensive scission of the polymer chain, leading to degradation of the polymer and a loss of plastic properties. It is, therefore, highly desirable to provide a process for the side chain chlorination of the polyphenylene oxides which will not result in chlorination of the aromatic nucleus with resulting degradation of the polymer.

I have now unexpectedly found that by the process of my invention, I can provide a polyphenylene oxide wherein at least 80 percent of the chlorine atoms are contained on methyl or other lower alkyl groups attached to the aromatic nucleus and less than 20 percent are substituted on the aromatic nucleus and wherein there is little degradation of the polymer due to chain scission. In addition, I have found that by the process of my invention, I can form polyphenylene oxides with α-chloroalkyl groups in yields of approximately 90% of the theoretical yield. Also, I have found that the process is applicable to polyphenylene oxides having other lower alkyl substituents—i.e., ethyl, propyl, butyl, etc.

Accordingly, one object of this invention is to provide an improved process for the alkyl chlorination of polyphenylene oxides.

Another object of this invention is to provide a process for the alkyl chlorination of polyphenylene oxides wherein at least 80 percent of the chlorine atoms are substituted on the alkyl groups, and less than 20 percent of the chlorine atoms are substiuted on the aromatic nucleus.

Still another object of this invention is to provide a process for the alkyl chlorination of polyphenylene oxides wherein yields of approximately 90 percent of theoretical are obtainable.

Other objects and advantages of this invention will be in part apparent and in part pointed out in the description which follows.

The above-mentioned Hay process of halogenating comprises dissolving a methyl substituted polyphenylene oxide in a suitable solvent that is inert to the halogenating agent such as a halogenated hydrocarbon and thereafter reacting with a brominating or chlorinating agent which may be the free elemental halogen, e.g., chlorine or bromine, or a halogenating agent, for example, sulfuryl chloride, sulfuryl bromide, bromosuccinimide, etc. The reaction is carried out at atmospheric, sub-atmospheric or super-atmospheric pressure, at, below or above ambient temperature, The preferred conditions are atmospheric pressure and a temperature from ambient up to that obtained by refluxing the reaction mixture. The method also comprises hastening the halogenation reaction by exposure of the solution to actinic radiation e.g., light from an ultra violet lamp. When a liquid or solid halogenation agent is used, enough is added to give the desired mono, di or trihalo substituted methyl groups on the polymer. If a gaseous halogenation agent is used, enough is passed into the reaction mixture until the amount absorbed is sufficient to give the desired degree of halogenation of the methyl groups. Hay found that in general, the preponderance of the methyl groups will be monohalogenated before a second halogen is introduced and dihalogenated before a third halogen is introduced into a significant number of methyl groups.

The halogenated polymer is recovered by pouring the solution into a large volume of a liquid which will precipitate the polymer and dissolve the balance of the reaction mixture. A convenient solvent for this purpose was found to be methanol. The product may be dissolved and reprecipitated as many times as desired to obtain the desired degree of purification.

I have now found that in the process for the chlorination of polyphenylene oxides, when the chlorination is carried out by passing a chlorine gas through the reaction mixture as described in the Hay application, the presence of either $PCl_3$ or $PCl_5$ in the reaction mixture produces products of considerably reduced aromatic chlorine content, often at better than 90 percent yields and with retention of the plastic properties of the material.

The effects on yields, intrinsic viscosity and relative benzylic chlorine content achieved when polyphenylene oxide is chlorinated with and without the presence of either $PCl_3$ or $PCl_5$ are shown in Table I below:

TALE I.—EFFECT OF $PCl_3$ ON CHLORINATION OF POLYPHENYLENE OXIDE

| | Intrinsic Viscosity, dl./g. | | Yield | Total Chlorine Content, Percent | Ratio of Benzylic to Total Chlorine |
|---|---|---|---|---|---|
| | Before Chlorination | After Chlorination | | | |
| Without $PCl_3$ | 1.2 | 0.38 | 51 | 17.9 | 0.63 |
| Do | 0.9 | (1) | 51 | 27.1 | 0.65 |
| With $PCl_3$ | 0.90 | 0.75 | 96 | 18.6 | 0.79 |
| Do | 0.85 | 0.53 | 94 | 11.2 | 0.85 |

[1] Not measured.

The process of the present invention is similar to that disclosed by Hay but for the use of $PCl_3$ or $PCl_5$. The polymer is dissolved in a high-boiling solvent, which itself is relatively resistant to chlorination. A small portion of the solvent is distilled off to remove any water present. Thereafter, either $PCl_3$ or $PCl_5$ is added to the solution and chlorine is passed through until the desired level of chlorination has been obtained. The desired level of chlorination means the desired number of chlorine atoms substituted on the polymer chain. For example, if a highly reactive polymer with fast curing properties is desired, then a large number of chlorine atoms should be substituted on the polymer chain—e.g., two chlorine atoms per polymeric repeating unit.

The chlorination is carried out at a high temperature since both $PCl_3$ and $PCl_5$ become progressively less efficient at lower temperatures. Thus, it is desirable to use an inert solvent with a boiling point higher than 100° C., and to carry out the reaction at the boiling point of the solvent. Suitable solvents include sym tetrachloroethane, mono- and dichlorobenzene, and in general, highly halogenated, high-boiling aliphatic and aromatic hydrocarbons. Lower boiling solvents may also be used if the chlorination is performed under higher than atmospheric pressure to allow higher reaction temperatures.

The concentration of polymer in the solution may vary from 1–20 percent and should preferably be between 5–10 percent. At higher concentrations, it becomes increasingly difficult to prevent precipitation of the high molecular weight polymer on the walls of the reactor, even with vigorous stirring. The amount of $PCl_3$ or $PCl_5$ which is employed should generally range from 10–150 percent by weight of the polymer. At the higher concentration, higher relative benzylic chlorine substitution will be achieved, but the costs are greatly increased. In a preferred embodiment of this invention, the amount of $PCl_3$ or $PCl_5$ used should range between 20–65 percent by weight of the polymer.

Subsequent to the passage of the chlorine gas through the reactor, the reaction mixture is heated for up to an additional 60 minutes to insure complete reaction. Thereafter, the polymer is isolated by precipitation in a nonsolvent for the polymer, such as methanol. The $PCl_3$ is converted by the reaction into a trialkylphosphite and can be removed from the polymeric product by a simple washing procedure. The total chlorine content of the polymer is easily determined by a number of methods known to the art such as combustion in oxygen of a weighed sample in a closed system followed by absorption of the gases in sodium peroxide and titration of the chloride ion.

The following examples are illustrative of the process of my invention but are not to be construed as limiting in any way.

EXAMPLE 1

In this example, 50 g. of poly-(2,6-dimethyl-1,4-phenylene)-oxide having an intrinsic viscosity of 0.85 dl./g. as measured in chloroform at 30° C. were dissolved in 1750 ml. of chlorobenzene in a reactor consisting of a 3 liter 3-neck round-bottom flask equipped with a dropping funnel, a mechanically sealed stirrer, a reflux condenser and an external electrical heating mantle. The solution was heated to boiling while stirring vigorously to prevent the polymer from settling on the wall of the flask. Fifty ml. of phosphorous trichloride (79 g.) were added dropwise to the boiling solution. The dropping funnel was then replaced with a sparger and sufficient chlorine gas passed through the solution for a period of one hour. The solution was maintained at boiling throughout the entire reaction. After passage of the chlorine gas through the reactor, the solution was cooled to room temperature, filtered and added to 3 liters of methanol to precipitate the polymer. The polymer was then washed with methanol and dried. The yield was 53 g. or 94 percent of theoretical. The total chlorine content was 11.2 percent.

To distinguish between benzylic and aromatic chlorine, the chlorinated polymer is dissolved in benzyl alcohol and trimethylamine is added. The aromatic chlorine will not react with the trimethylamine. The benzylic chlorine will become ionized in the present of the trimethylamine, because of the formation of a quaternary amine chloride. The quantity of the ionic chlorine is then determined by potentiometric titration. Knowing the quantity of benzylic chlorine, the armoatic chlorine is determined by substracting the quantity of benzylic chlorine from total chlorine content.

Using the above procedure, it was found that 85% of the total chlorine content was substituted on the methyl groups and only 15% was substituted on the aromatic nucleus.

The intrinsic viscosity of the polymer was determined using an Ostwald type solution viscosimeter. Viscosities were determined in chloroform solution at 30° C. and are expressed in deciliters per gram units (dl./g.). The intrinsic viscosity of the polymer was found to be 0.53 dl./g.

EXAMPLE 2

Utilizing the reactor of Example 1, 50 g. of poly-(2,6-dimethyl-1,4-phenylene)-oxide having an intrinsic viscosity of 0.90 dl./g. were dissolved in 150 ml. of freshly distilled sym tetrachloroethane. Fifty ml. of $PCl_3$ were added at once to the solution which was then heated to boiling. Chlorine gas was passed into the boiling solution at a rate of 180 mls. per minute for a period of 105 minutes. The chlorinated solution was then cooled to room temperature, filtered and added to 3 liters of methanol causing the product to precipitate. The yield was found to be 56 g. or 87 percent of the theoretical yield. The total chlorine content was found to be 22.3 percent of which 19.5 percent was benzylic chlorine. This represents a ratio of benzylic chlorine to total chlorine content of 0.87. The intrinsic viscosity of the product was measured using the procedure of Example 1 and found to be 0.63 dl./g.

EXAMPLE 3

The procedure of Example 2 was repeated, however, chlorine was passed through the reaction mixture for 86 minutes instead of 105 minutes as in Example 2. In this example, the yield was found to be 59 g. or 96 percent of theoretical yield. Total chlorine content was found to be 18.6 percent of which 14.8 percent was benzylic chlorine. The intrinsic viscosity of the product was found to be 0.75 dl./g.

EXAMPLE 4

The procedure of Example 2 was repeated using a poly-(2,6-dimethyl-1,4-phenylene)-oxide having an intrinsic viscosity of 0.75 dl./g. In this example, chlorine gas was passed through the reactor for only 50 minutes. The yield was found to be 54 g. of polymer or 92 percent of the theoretical amount. The total chlorine content was found to be 15.1 percent of which 13.2 percent was benzylic chlorine. The ratio of benzylic chlorine to total chlorine was 0.87. The intrinsic viscosity of the product was found to be 0.58 dl./g.

EXAMPLE 5

In this example, 50 g. of the polyphenylene oxide of Example 4 were chlorinated utilizing the procedure of Example 2. Chlorine gas was passed through the reactor for a period of 25 minutes. The chlorinated polymer was precipitated in the manner defined above and the resultant polymer yield was 53 g. or 97 percent of the theoretical yield. The total chlorine content was 8.7 percent of which benzylic chlorine was found to constitute 7 percent. The ratio of benzylic to total chlorine content was 0.80.

EXAMPLE 6

In this example, the reactor of Example 1 was again employed. One hundred grams of poly-(2,6-dimethyl-1,4-phenylene)-oxide having an intrinsic viscosity of 0.93 dl./g. as measured in chloroform at 30° C. were dissolved in 1200 ml. of chlorobenzene. Two hundred ml. of solvent were distilled off to remove any water present. The solution was cooled to 70° C. and 50 ml. of $PCl_3$ (79 g.) were added. Chlorine gas was passed into the boiling solution for 165 minutes at a rate of 0.38 gram per minute. This was sufficient to fully chlorinate the polymer. The solution was then cooled to room temperature, filtered and added to 3 liters of methanol causing the polymer to precipitate. The product was washed with methanol and dried. The yield was 114 g. or 91 percent of the theoretical yield. Using the procedures of Example 1, the total chlorine content was determined to be 19.8 percent. The benzylic chlorine content was found to be 15.7%. This constituted a ratio of 0.79 benzylic chlorine to total chlorine. The intrinsic viscosity of the product was found to be 0.45 dl./g.

EXAMPLE 7

Fifty g. of a poly-(2,6-dimethyl-1,4-phenylene)-oxide having an intrinsic viscosity of 0.49 dl./g. were dissolved in 2,000 ml. of chlorobenzene in the reactor of Example 1. Five hundred ml. of solvent were distilled off to remove water and the solution returned to room temperature. Thereafter, 20 ml. of $PCl_3$ (31.5 g.) were added to the solution at room temperature and the resulting solution was returned to the boiling point of the chlorobenzene under reflux conditions. Chlorine gas was passed into the solution at a rate of 0.38 gram per minute for 120 minutes, 0.36 gram per minute for 30 minutes and 0.23 gram per minute for 30 minutes. The solution was then returned to 70° C. As in Example 1, the solution was filtered and the polymer precipitated with methanol. The yield was found to be 68 g. or 88 percent of the theoretical yield. The total chlorine content was 36.4 percent of which benzylic chlorine constituted 29.4 percent. The ratio of the benzylic chlorine to the total chlorine content was 0.81.

EXAMPLE 8

Using the procedure of Example 7, 50 g. of poly-(2,6-dimethyl-1,4-phenylene)-oxide having intrinsic viscosity of 0.75 dl./g. as measured in chloroform at 30° C. were chlorinated in the presence of 20 ml. of $PCl_3$ (31.5 g.) for a period of 20 minutes. The yield was 51 g. of polymer or 96 percent of the theoretical yield. The total chlorine content was 6.3 percent; benzylic chlorine content was 5.5 percent. The benzylic chlorine to total chlorine ratio was 0.87.

EXAMPLE 9

Employing the reactor of Example 1, 100 g. of poly-(2,6-dimethyl-1,4-phenylene)-oxide having an intrinsic viscosity of 0.33 dl./g. as measured in chloloform at 30° C. were dissolved in 2,000 ml. of chlorobenzene. Five hundred ml. of the chlorobenzene were distilled off to remove water. Twenty ml. of $PCl_3$ (31.5 g.) were added to the cooled solution. The solution was then heated to the boiling point of the chlorobenzene and chlorine passed into the refluxing solution for 5 minutes at a rate of 0.36 gram per minute. Ninety-two g. of the polymer were obtained or 78 percent of the theoretical yield. The polymer contained 15.6 percent chlorine. Eighty-five percent of the total chlorine content was benzylic chlorine.

EXAMPLE 10

In this example, 2,500 g. of poly-(2,6-dimethyl-1,4-phenylene)-oxide having an intrinsic viscosity of 0.93 dl./g. as measured in chloroform at 30° C. were dissolved in 7.5 gallons of chlorobenzene in a glass-lined, 10 gallon steel reactor equipped with a stirrer, a glass-lined condenser, a superheated steam heating mantle and a gas sparger. One-half gallon of solvent was distilled off to remove water. The solution was then cooled and 300 ml. of $PCl_3$ (540 g.) were added. The solution was then returned to reflux and approximately 550 g. of chlorine gas were passed into the reactor over a period of 165 minutes. After passage of the chlorine gas through the reactor, the reaction mixture was held at reflux for an additional 30 minutes to insure complete reaction. The solution was then cooled to room temperature and filtered through cheesecloth. The resulting solution was added to methanol to precipitate the polymer. The polymer was washed with methanol. The product contained 2.6 percent total chlorine of which 2.0 percent was benzylic chlorine. The ratio of benzylic to total chlorine was 0.84.

In all of the remaining examples, the chlorination procedure was carried out without the presence of $PCl_3$ to illustrate the improved yields and higher benzylic chloride content resulting from the process of this invention.

EXAMPLE 11

Employing the reactor of Example 1, 50 g. of poly-(2,6-dimethyl-1,4-phenylene)-oxide having an intrinsic viscosity of 1.2 dl./g. as measured in chloroform at 30° C. were dissolved in 1500 ml. of boiling sym tetrachloroethane. No $PCl_3$ was added but approximately 35 g. of chlorine gas were passed into the solution over a period of 4 hours. The solution was cooled and filtered and added to methanol to precipitate the polymer. The yield was 31 g. or 51 percent of the theoretical yield and contained 17.9 percent chlorine of which 11.3 percent was benzylic chlorine. The ratio of benzylic chlorine to total chlorine content was 0.63. The intrinsic viscosity of the product was found to be 0.38 dl./g.

From the above example, it is apparent that the absence of $PCl_3$ or $PCl_5$ in the reaction mixture resulted in low yield. Benzylic chlorine content was low and intrinsic viscosity was reduced from 1.2 dl./g. to 0.38 dl./g. This reduction in the intrinsic viscosity indicates that the polymer was degraded due to the high chlorine content substituted on the aromatic nucleus.

EXAMPLE 12

Using the procedure of Example 11, 43 g. of chlorine gas were passed into a boiling solution of 50 grams of poly-(2,6-dimethyl-1,4-phenylene)-oxide dissolved in 1500 ml. of sym tetrachloroethane over a period of 1½ hours while the reactor was being illuminated by five incandescent light bulbs with a combined power of 1175 watts. The purpose of the incandescent light bulbs was to catalyze the chlorination reaction as Hay found that this induced chlorination. The resulting product weighed 30.4 g. and amounted to 48 percent of the theoretical yield. The total chlorine content was 21.6 percent of which 14.7 percent was benzylic chlorine. This amounted to a ratio of 0.68 benzylic chlorine to total chlorine content.

Again, it can be seen that the yield was low and the amount of benzylic chlorine lower than obtained when a $PCl_3$ catalyst is used even though the reaction was illuminated with incandescent light bulbs.

EXAMPLE 13

Using the reactor of Example 1, 50 g. of a poly-(2,6-dimethyl-1,4-phenylene)-oxide having an intrinsic viscosity of 1.2 dl./g. as measured in chloroform at 30° C. were dissolved in 2,000 ml. of carbon tetrachloride. Eighty ml. of sulfuryl-chloride (134 g.) and 0.5 g. of benzoyl peroxide were added to the solution. The solution was stirred for 2 hours at room temperature and gradually heated over a period of 1½ hours until gentle refluxing was obtained. The solution was subsequently cooled and filtered and the product precipitated by adding the solution to 3 liters of methanol and dried. The yield was 60 g. or 88 percent of theoretical yield. The total chlorine content was 27.2 percent of which 8.2 percent was benzylic chlorine. The ratio of benzylic chlorine to total chlorine content was 0.30. Thus, again, the total benzylic chlorine content was low due to the absence of $PCl_3$ or $PCl_5$.

It is to be understood that changes may be made in the particular embodiments of the invention described which are within the full intent and scope of the invention as defined by the appended claims.

What I claim as new and desire to secure by Letters Patent of the United States is:

1. In a process for preparing chloroalkyl substituted polyphenylene oxides which comprises reacting chlorine gas with a polyphenylene oxide having the structural formula:

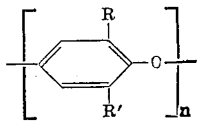

wherein $n$ is a positive integer and is at least 100, R is a monovalent constituent selected from the group consisting of hydrogen, halogen, hydrocarbon, halohydrocarbon, hydrocarbonoxy and halohydrocarbonoxy, and R′ is a lower alkyl; the improvement which comprises causing the reaction to occur in the presence of a member selected from the group consisting of $PCl_3$ and $PCl_5$.

2. The process of claim 1 where the polyphenylene oxide is a poly-(2,6-dimethyl-1,4-phenylene)-oxide.

3. The process of claim 1 where the polyphenylene oxide is a poly-(2,6-diethyl-1,4-phenylene)-oxide.

4. The process of claim 1 wherein the reaction occurs in the presence of $PCl_3$.

5. The process of claim 1 wherein the reaction occurs in the presence of $PCl_5$.

No references cited.

WILLIAM H. SHORT, *Primary Examiner.*

M. GOLDSTEIN, *Assistant Examiner.*